United States Patent [19]

Yeh

[11] Patent Number: 4,968,107

[45] Date of Patent: Nov. 6, 1990

[54] REAL TIME IMAGE INVERSION USING FOUR-WAVE MIXING

[75] Inventor: Pochi A. Yeh, Thousand Oaks, Calif.

[73] Assignee: Rockwell International Corporation, El Segundo, Calif.

[21] Appl. No.: 256,807

[22] Filed: Oct. 11, 1988

[51] Int. Cl.[5] .................. G03H 1/16; G03H 1/22; G02B 27/46

[52] U.S. Cl. .................. 350/3.64; 350/3.85; 350/162.13

[58] Field of Search ............. 350/3.64, 3.85, 162.12, 350/162.13

[56] References Cited

U.S. PATENT DOCUMENTS

| | | | |
|---|---|---|---|
| 4,025,195 | 5/1977 | Ebersole et al. | 356/71 |
| 4,124,278 | 11/1978 | Grinberg et al. | 350/342 |
| 4,212,536 | 7/1980 | Bencze et al. | 350/3.6 |
| 4,277,137 | 7/1981 | Upatnieks et al. | 350/162 SF |
| 4,429,954 | 2/1984 | Caulfield et al. | 350/3.64 |
| 4,674,824 | 6/1987 | Goodman et al. | 350/3.64 |
| 4,718,749 | 1/1988 | Chiou et al. | 350/163 |

OTHER PUBLICATIONS

Anderson et al., Optical Tracking Novelty Filter, Optics Letters, vol. 12, p. 123 (1987).
Chiou et al., Parallel Image Subtraction Using a Phase-Conjugate Michelson Interferometer, Optics Letters, vol. 11, p. 306 (1986).
Fainman, Optical Digital Logic Operations by Two-Beam Coupling in Photorefractive Material, Applied Optics, vol. 25, p. 1598 (1986).
Indebetouw, Real-Time Incoherent Subtraction of Irradiance, Applied Optics, vol. 19, p. 1218 (1980).
Ja, Real-Time Image Subtraction in Four-Wave Mixing with Photorefractive $Bi_{120}BeO_{20}$ Crystals, Optics Communications, vol. 42, p. 377 (1982).
Kwong et al., Real Time Image Subtraction and "Exclusive OR" Operation Using a Self-Pumped Phase Conjugate Mirror, Applied Physics Ltrs., vol. 48, p. 201 (1986).
Ochoa, Real-Time Intensity Inversion Using Two-Wave and Four-Wave Mixing in Photorefractive $Bi_{12}GeO_{20}$, Applied Optics, vol. 24, p. 1826 (6/1985).
Patorski, Subtraction and Addition of Optical Signals Using a Double-Grating Shearing Interferometer, Optics Communications, vol. 29, p. 13 (1979).
Yu et al., Incoherent Image Addition and Subtraction: A Technique, Applied Optics, vol. 18, p. 2705 (1979).

Primary Examiner—Bruce Y. Arnold
Assistant Examiner—Terry S. Callaghan
Attorney, Agent, or Firm—John J. Deinken

[57] ABSTRACT

An intensity inverter includes an optically nonlinear medium and a reference beam having a uniform transverse intensity distribution and having the same wavelength as the signal beam. The reference beam is directed into the nonlinear medium. A readout beam having the same wavelength as the signal beam and counterpropagating with respect to the reference beam is also directed into the nonlinear medium. When the signal beam is directed into the nonlinear medium, the signal beam and the reference beam interact to form a hologram within the nonlinear medium, thereby diffracting a portion of the readout beam, the undiffracted portion of the readout beam having imposed on it an inversion of the signal.

6 Claims, 2 Drawing Sheets

REAL TIME IMAGE INVERSION USING FOUR-WAVE MIXING

BACKGROUND OF THE INVENTION

This invention is concerned with techniques for processing information which is transmitted optically, such as in an optical communications system or in an optical computer.

The inherent parallelism of optics (i.e., a beam of light can carry different information on different portions of the light beam without interference) and the wide bandwidth which an optical system offers for communication make such a system ideal for applications such as real-time image processing, optical interconnection schemes, and associative processing. As a result, optics is emerging as an area of increasing importance in high-speed information processing. Real-time image processing is of particular interest in fields, such as robotics, which require the recognition and tracking of objects. A clear advantage to the optical approach for these applications is the capability of parallel processing, with its concomitant increase in processing speed over digital computing techniques. Additional applications for optical image processing include industrial quality assurance, optical logic gates, and the detection of motion in a scene. Real-time contrast reversal of an image is an important step in image algebra, which deals with mathematical operations such as the addition, subtraction, multiplication, and division of spatial images. See, e.g., Chiou, et al., Phase-Conjugate Interferometric Coherent Image Subtraction, U.S. Pat. No. 4,718,749; Yeh, Nonlinear Optical Matrix Manipulation, U.S. Pat. No. 4,767,197.

A large number of signal and image processing algorithms require the intensity inversion of a spatial image. The use of electronic digital processing for this operation is very slow because of its serial nature. By contrast, the optical approach, with its inherent parallelism, offers the potential for great improvement in the speed of such operations. Real-time contrast reversal can be achieved with several different approaches. In a manner very similar to image subtraction, for example, contrast reversal can be accomplished by subtracting an image from a uniformly illuminated picture containing no image information. In addition, real-time contrast reversal can also be attained by using image division (or intensity inversion) where the output intensity pattern is inversely proportional to the input intensity pattern. The latter technique takes advantage of the dependence of four-wave mixing efficiency on the intensity ratios between the beams in photorefractive media. Contrast reversal has also been demonstrated in Fe:LiNbO$_3$ crystals using pump beam depletion in two-wave mixing. Recently, real-time contrast reversal has been achieved by using selective erasure of holographic gratings during two-wave mixing in a BaTiO$_3$ photorefractive crystal.

SUMMARY OF THE INVENTION

With this invention, the nonlinear optical phenomenon of four-wave mixing can be used to quickly and efficiently generate an intensity inversion of an optical signal. The intensity inverter of this invention includes an optically nonlinear medium and a reference beam having a uniform transverse intensity distribution and having the same wavelength as the signal beam. The reference beam is directed into the nonlinear medium. A readout beam having the same wavelength as the signal beam and counterpropagating with respect to the reference beam is also directed into the nonlinear medium. When the signal beam is directed into the nonlinear medium, the signal beam and the reference beam interact to form a hologram within the nonlinear medium, thereby diffracting a portion of the readout beam, the undiffracted portion of the readout beam having imposed on it an inversion of the signal.

In more particular embodiments, the nonlinear medium may be either a Kerr medium or a photorefractive crystal. The photorefractive crystal may be selected from the group consisting of $Ba_{2-x}Sr_xK_{1-y}Na_yNb_5O_{15}$, $BaTiO_3$, $KNbO_3$, and $Sr_{1-x}Ba_xNb_2O_6$.

The inverter may also include a first beam splitter for redirecting the diffracted beam and a second beam splitter for redirecting the undiffracted beam.

A method of inverting the intensity of a signal imposed on an optical signal beam in the form of variations in the transverse intensity of the signal beam, includes, according to the present invention, the steps of providing an optically nonlinear medium, directing a reference beam, having a uniform transverse intensity distribution and having the same wavelength as the signal beam, into the nonlinear medium, and directing a readout beam, having the same wavelength as the signal beam, counterpropagating with respect to the reference beam and into the nonlinear medium. The signal beam is directed into the nonlinear medium such that the signal beam and the reference beam interact to form a hologram within the nonlinear medium, thereby diffracting a portion of the readout beam, the undiffracted portion of the readout beam having imposed on it an inversion of the signal.

DESCRIPTION OF THE INVENTION

With this invention, it is possible to perform contrast reversal, in real time and in a parallel fashion, by using pump depletion in an optical four-wave mixing process. This technique can be employed with either photorefractive media or Kerr media.

Figure 1:
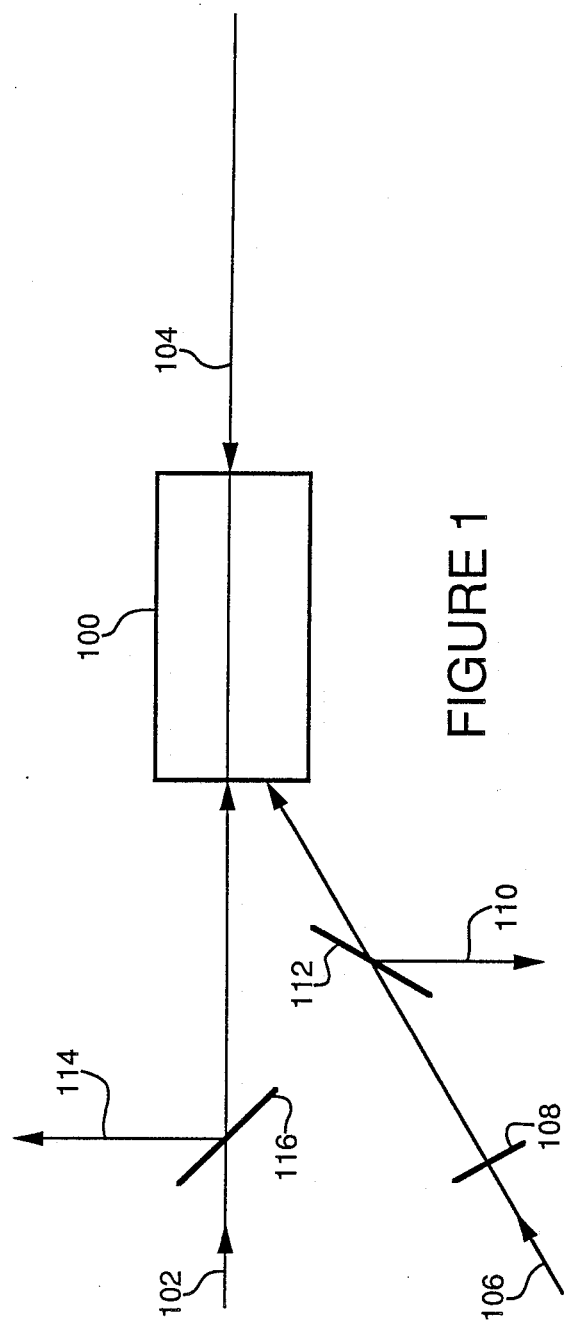
FIG. 1 is a schematic diagram illustrating one apparatus for practicing the invention.

FIG. 1 is a schematic diagram illustrating one apparatus for practicing this invention. The optical intensity inverter in FIG. 1 includes an optically nonlinear medium 100, into which are directed a reference beam 102 and a readout beam 104. The reference and readout beams have the same wavelength and are counterpropagating with respect to each other. In addition, the intensity of the reference beam is uniform in directions transverse to the propagation direction of the beam. A signal beam 106, which has the same wavelength as the reference and readout beams, passes through an image 108. As a consequence, the superimposed image introduces variations in the transverse intensity of the signal beam. When the signal beam is directed into the nonlinear medium, the signal beam and the reference beam interact to form a hologram within the nonlinear medium 100. This hologram, in turn, diffracts a portion of the readout beam, which thus emerges from the nonlinear medium as a diffracted beam 110. The diffracted beam is counterpropagating with respect to the signal beam 106 and is deflected by a first beam splitter 112. The remaining portion of the readout beam, which is not diffracted by the hologram, emerges from the nonlinear medium counterpropagating with respect to the reference beam 102. This undiffracted beam 114 is deflected by a second beam splitter 116. The undiffracted beam 114 will have imposed on it the contrast reversal of the intensity pattern corresponding to the image 108.

In another embodiment of the invention, the signal beam 106 can be directed parallel to the readout beam 104, so that the signal beam enters the same surface of the nonlinear medium as the readout beam. In this embodiment, polarizing beam splitters can be used to separate the undiffracted beam 114 from the other beams. This configuration can be advantageous in several situations. For example, it avoids any transverse beam crossings, which may lead to local energy depletion and image degradation.

In addition to performing contrast reversal, the invention is also useful in performing such Boolean logic operations as ANDing and NANDing, providing appropriate thresholding is arranged for the optical inputs and outputs. In this application, either an opaque or fully transmitting image is imposed on the appropriate beams, corresponding to a binary 0 or 1, respectively. Tables 1 and 2 list the truth tables for these two logic operations. As can be seen from Table 1, which is the truth table for the NAND operation, the inputs for this function are applied to the reference beam 102 and the signal beam 106, while the output is obtained from the undiffracted beam 114. In the case of ANDing, as shown in Table 2, the inputs are applied to the reference beam and the readout beam, while the output appears on the diffracted beam 110.

TABLE 1

| NAND | | |
|---|---|---|
| First Input (Reference Beam) | Second Input (Signal Beam) | Output (Undiffracted Beam) |
| 1 | 1 | 0 |
| 1 | 0 | 1 |
| 0 | 1 | 1 |
| 0 | 0 | 1 |

TABLE 2

| AND | | |
|---|---|---|
| First Input (Reference Beam) | Second Input (Readout Beam) | Output (Diffracted Beam) |
| 1 | 1 | 1 |
| 1 | 0 | 0 |
| 0 | 1 | 0 |
| 0 | 0 | 0 |

EXAMPLE 1

Figure 2:
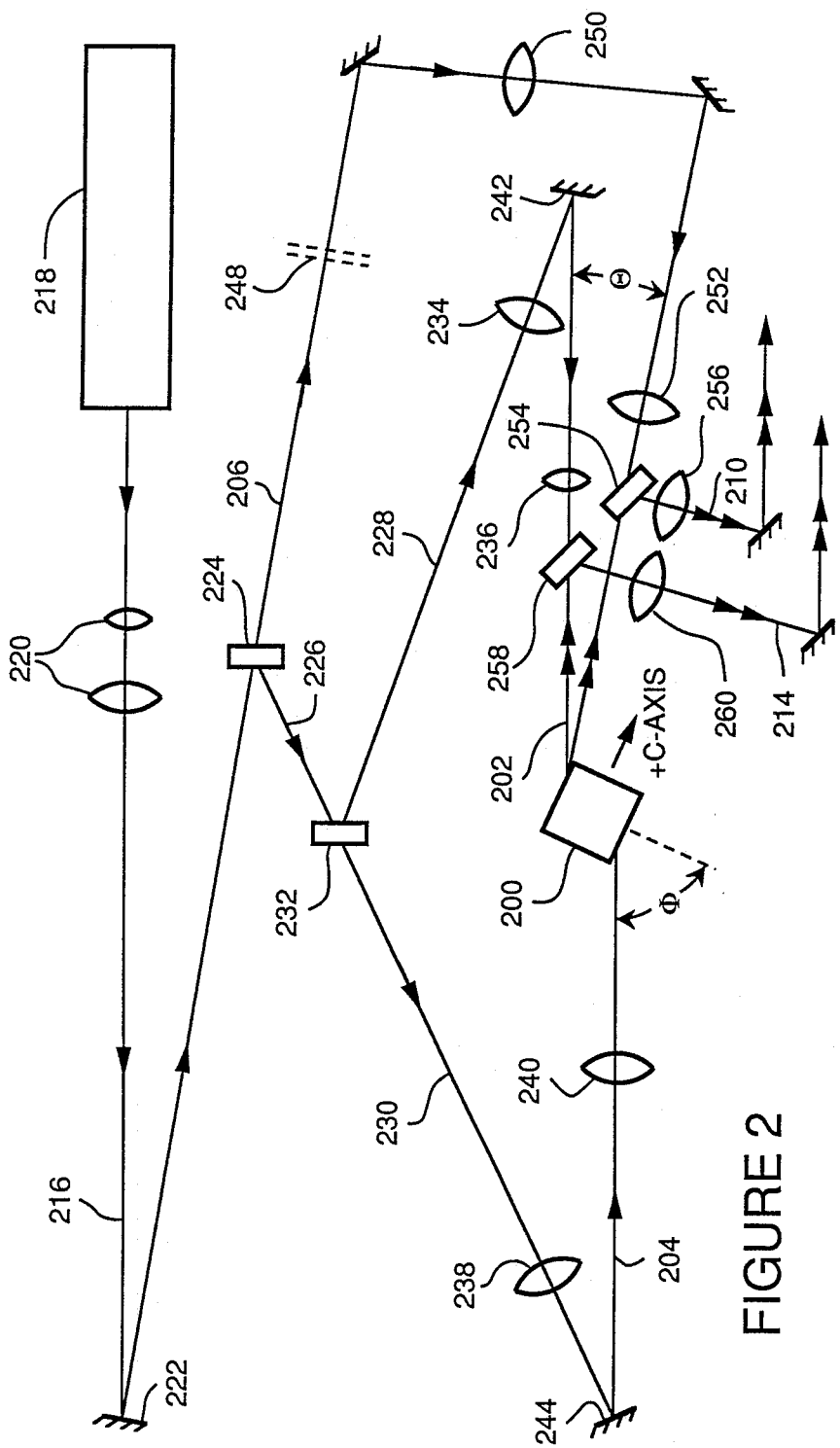
FIG. 2 is a schematic illustration of a standard four-wave mixing geometry with proper beam expansion, beam collimation, beam size reduction, and telescopic imaging, used to practice the present invention.

A standard four-wave mixing geometry with proper beam expansion, beam collimation, beam size reduction, and telescopic imaging, as illustrated schematically in FIG. 2, was used to demonstrate the concept of this invention.

The output beam 216 of an Ar ion laser (5145Å) 218 was expanded and collimated by a beam expander and collimator 220 to a beam diameter of 1 cm. This beam, after being redirected by a first mirror 222, was split into two beams by a beam splitter 224, which had an intensity transmittance of 10%. The reflected beam 226 was further split into two equal beams 228 and 230 by a beam splitter 232. The beams 228 and 230 were directed by mirrors 242 and 244, respectively, into a photorefractive $BaTiO_3$ crystal 200 to form two counterpropagating pumping beams 202 and 204. A pair of lenses 234 and 236 formed an inverted telescope to reduce the diameter of the collimated beam 202 inside the crystal 200 to 2 mm, while a pair of lenses 238 and 240 provided a similar function for the collimated beam 204.

The portion 206 of the beam transmitted by the beamsplitter 224 was used to illuminate a test transparency 248, which was located at the back focal plane of a lens 250. The photorefractive crystal 200 was place so that the lens 250 and a lens 252 projected a reduced image at the crystal. A beam splitter 254 split off the phase-conjugated beam 210, which was imaged by a lens 256, while a beam splitter 258 splits off the transmitted read beam 214, which is imaged by a lens 260.

The $BaTiO_3$ crystal 200 was oriented so that the angle of incidence $\phi$ of the pumping beam 204 with respect to the a-face normal was approximately 48°, while the angle $\theta$ between the image writing beam 206 and the reference writing beam 202 was about 13°. The c-axis of the crystal was oriented so that the phase-conjugated signal would be further enhanced by two-wave mixing gain. All the beams were polarized in the plane of incidence (i.e., extraordinary polarization). This geometry used the combination of $r_{33}$ and the largest electrooptic coefficient $r_{42}$ of the $BaTiO_3$ crystal.

The four-wave mixing process in the crystal generated a phase-conjugated beam of the image beam which carried the input image information. The intensity of the phase-conjugated beam was amplified by the photorefractive two-wave mixing gain inside the crystal. Since the energy of this image was extracted primarily from the reading beam, the remainder of the reading beam carried the same information due to localized energy depletion of an otherwise uniform beam. Thus, the undiffracted portion of the read beam contained the contrast reversal of the input image.

The preferred embodiments of this invention have been illustrated and described above. Modifications and additional embodiments, however, will undoubtedly be apparent to those skilled in the art. To achieve maximum pump beam depletion, for example, the photorefractive crystal must be oriented at a large angle of incidence to use the largest electro-optic coefficient. This geometry, however, leads to multiple reflections from the side surfaces and edges of the crystal. Image degradation due to such multiple reflections from the side surfaces and edges can be eliminated by using crystals with entrance faces of (011) or (101). In this configuration, the beams can enter the crystal at nearly normal incidence. Another possible source of image degradation is due to beam fanning. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

Chiou, et al., Phase-Conjugate Interferometric Coherent Image Subtraction, U.S. Pat. No. 4,718,749;

Yeh, Nonlinear Optical Matrix Manipulation, U.S. Pat. No. 4,767,197.

I claim:

1. A method of inverting the intensity of a signal imposed on an optical signal beam in the form of variations in the transverse intensity of the signal beam, comprising the steps of:

providing an optically nonlinear medium;

directing a reference beam, having a uniform transverse intensity distribution and having the same wavelength as the signal beam, into the nonlinear medium;

directing a readout beam, having the same wavelength as the signal beam, counterpropagating with respect to the reference beam and into the nonlinear medium, directing the signal beam into the nonlinear medium such that the signal beam and the reference beam interact to form a hologram within the nonlinear medium, thereby diffracting a portion of the readout beam, the undiffracted portion of the readout beam having imposed on it an inversion of the signal.

2. The method of claim 1, wherein the step of providing a nonlinear medium further comprises the step of providing a Kerr medium.

3. The method of claim 1, wherein the step of providing a nonlinear medium further comprises the step of providing a photorefractive crystal.

4. The method of claim 3, wherein the step of providing a photorefractive crystal further comprises the step of providing a photorefractive crystal selected from the group consisting of $Ba_{2-x}Sr_xK_{1-y}Na_yNb_5O_{15}$, $BaTiO_3$, $KNbO_3$, and $Sr_{1-x}Ba_xNb_2O_6$.

5. The method of claim 1, further comprising the step of providing a first beam splitter for redirecting the diffracted beam.

6. The method of claim 5, further comprising the step of providing a second beam splitter for redirecting the undiffracted beam.

* * * * *